S. G. CLOUGH,

Assignor to THE SEMPLE AND BIRGE MANUFACTURING COMPANY.

WAGON SPRING.

No. 9,813. Reissued July 19, 1881.

Attest:
Charles Pickles
Saml. S. Boyd.

Inventor:
Samuel G. Clough
by C. D. Moody
atty:

UNITED STATES PATENT OFFICE.

SAMUEL G. CLOUGH, OF SILVER CLIFF, COLORADO, ASSIGNOR TO THE SEMPLE & BIRGE MANUFACTURING COMPANY, OF ST. LOUIS, MO.

WAGON-SPRING.

SPECIFICATION forming part of Reissued Letters Patent No. 9,813, dated July 19, 1881.

Original No. 51,697, dated December 26, 1865. Application for reissue filed March 17, 1881.

*To all whom it may concern:*

Be it known that I, SAMUEL G. CLOUGH, now of Silver Cliff, Colorado, formerly of Waupun, Wisconsin, have made a new and useful Improvement in Wagon-Springs, of which the following is a full, clear, and exact description, reference being had to the annexed drawings, making part of this specification, in which—

Figure 1:
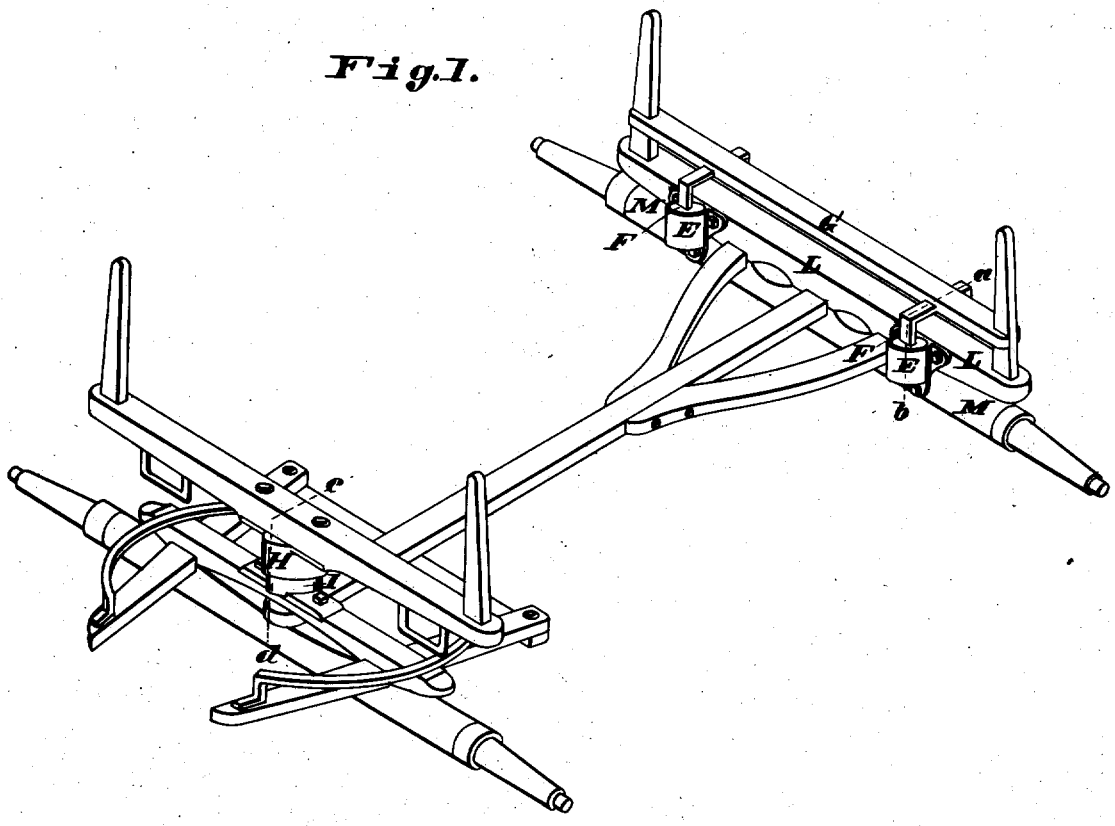
Figure 2:
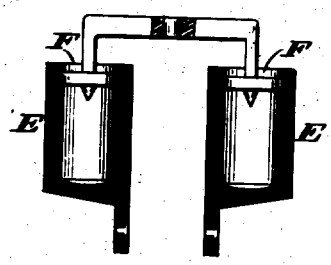

Figure 1 is a view in perspective of a wagon-gear having the improvement; Fig. 2, a section taken on the line *a b*, Fig. 1, through the cups which hold the springs and through the pistons; and Fig. 3, a section taken on the line *c d*, Fig. 1, through the cups upon the forward axle and sand-board.

The same letters denote the same parts.

The nature of my invention consists in attaching two sets of cast-iron cups to the hind axle and bolster of a wagon in such manner as to receive rubber springs, on which pistons are placed, which are attached to the cross-bar above the bolster, and which support the box or load; also, in using two cups for the forward axle, which are made in such a manner as to hold the spring, answer the purpose of bolster-plates, and keep out the dirt and gravel. Thus it will be seen that good durable springs are easily and permanently applied to a lumber-wagon.

I construct the wagon in any of the well-known forms, and apply or attach my improvements thereto in the following manner: On each side of the hind bolster, L, and axle M, I attach two cups, E E, Fig. 1, in which I place rubber springs. On these springs press a double piston, F F, Fig. 1, which is connected to the cross-bar G, that sustains the load. The cups have flanges *a*, through which the bolts *b* pass, that fasten them to the bolster and axle of the wagon, thereby affording a durable mode of attaching them thereto and to each other. Another object is accomplished by my mode of attachment—the strengthening of the axle by connecting it with the bolster by means of the bolts and flanges on the cups.

In my arrangement I do not use a rubber spring thinking it to be new, or its application to lumber-wagons as new, but simply from the fact of its being a good elastic spring. Neither do I use the cups thinking them to be new, nor could I without adapting them to the specific purpose; but to do this they need to be changed so as to conform to the sides of the bolster and axle on which they are placed, and afford ready means of attaching them thereto. To accomplish this I cause a flange, *a*, to be made so as to project below the bottom and from each side of the cup, so as to permit bolts to pass through them to confine them to the bolster and axle. These bolts, passing through the flange on one side of the bolster and axle, and then through the bolster and axle, and then through the flange on the other side, are confined by means of a head and nut in the ordinary way. Between the front bolster and sand-board I insert another spring by means of two cups, as shown at H I, Fig. 1. These cups serve the purpose of bolster-plates, and take their place when applied.

Figure 3:
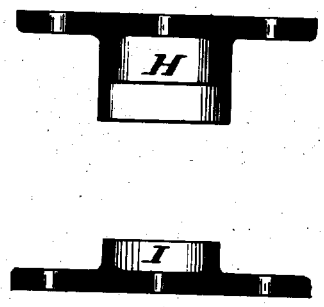

To prevent the dirt and sand from falling into the front cups I make the upper one to project down over the lower one, as seen in Fig. 3, the rubber being contained in both cups.

I am aware that rubber springs have been applied to lumber-wagons by means of clasps passing below the hind axle and pins passing through the axle and bolster and communicating with the cross-bar. There are objections to this mode of application. The clasp passing below the axle is liable to be caught by obstructions and broken, and passing the pin through the axle and bolster weakens them and makes them more liable to be broken when loaded. In place of being weakened, the bolster and axle, by means of the present improvement, are strengthened.

I am also aware that springs have been applied to the forward bolster and axle by means of a cup cut into and placed upon the axle, completely cutting into the sand-board and deeply into the axle. This mode is also objectionable, from its weakening the axle and in having the cup open at the top.

I claim—

1. The combination of the cups E E, the axle M, the bolster L, the double-headed piston F F, and cross-bar G, substantially as described.

2. A device for elastically supporting the bed of a wagon, the springs of which device are supported at the sides of the bolster and are connected by a bar which extends above the bolster and upon which the wagon-bed removably rests, substantially as shown and described.

3. The combination of the cups E E, axle M, and bolster L, for the purpose of sustaining springs at the sides of the bolster.

4. The combination of the cups E E, supporting springs, the bolster L, the part F F, and bar G, substantially as described.

SAMUEL G. CLOUGH.

Witnesses:
F. G. HAGAN,
CHAS. HEIGHAM.